United States Patent [19]

Nijhuis

[11] 4,319,383

[45] Mar. 16, 1982

[54] APPARATUS FOR ELECTRICALLY STUNNING ANIMALS TO BE SLAUGHTERED

[75] Inventor: Johan W. Nijhuis, Winterswijk, Netherlands

[73] Assignee: Machinefabriek G. J. Nijhuis B.V., Netherlands

[21] Appl. No.: 148,034

[22] Filed: May 8, 1980

[30] Foreign Application Priority Data

May 10, 1979 [NL] Netherlands ..................... 7903680

[51] Int. Cl.³ .............................................. A22B 3/06
[52] U.S. Cl. ..................................................... 17/1 E
[58] Field of Search ........................................... 17/1 E

[56] References Cited

FOREIGN PATENT DOCUMENTS 125258 11/1931 Fed. Rep. of Germany ........ 17/1 E
206339 12/1967 U.S.S.R. ................................. 17/1 E

*Primary Examiner*—Willie G. Abercrombie

*Attorney, Agent, or Firm*—Arnold, White & Durkee

[57] ABSTRACT

An apparatus is provided for electrically stunning animals. Said apparatus comprises two endless conveyors running parallel to each other and positioned to form a V-shaped passageway therebetween and two sets of electrodes which extend downwardly into the V-shaped passageway. Each set of electrodes is pivotally mounted about a horizontal axis located above the passageway to enable the electrodes to pivot in the direction of movement of the conveyors. The first set of electrodes slopes downwardly and forwardly with respect to the direction of movement of the conveyors, and the first electrodes have a small electrode contact surface at their bottom end. The second set slopes downwardly and rearwardly with respect to the direction of movement of the conveyors, and the second electrodes have an electrode contact surface covering substantially the entire side that faces the first set of electrodes.

2 Claims, 2 Drawing Figures

APPARATUS FOR ELECTRICALLY STUNNING ANIMALS TO BE SLAUGHTERED

CROSS-REFERENCE TO RELATED APPLICATIONS

This application discloses subject matter related to application Ser. No. 905,371, filed May 12, 1978, now abandoned; co-pending application Ser. No. 147,826, filed May 8, 1980; co-pending application Ser. No. 147,827, filed May 8, 1980; co-pending application Ser. No. 148,033, filed May 8, 1980; co-pending application Ser. No. 161,298, filed June 20, 1980; and co-pending application Ser. No. 202,322, filed Oct. 30, 1980.

BACKGROUND OF THE INVENTION

The invention relates generally to an apparatus for electrically stunning animals to be slaughtered, in particular pigs. More specifically, the invention relates to apparatus comprising two endless conveyors, which are operable to run parallel to each other and at a synchronized rate and are positioned to form a substantially V-shaped passageway therebetween, an a pair of electrodes or sets of electrodes, being adapted to engage the head of the animals and to extend downwardly into said V-shaped passageway at a distance spaced apart from each other in line with the direction of movement of said conveyors. The electrodes pivot in the direction of movement from their initial position, and pivot about horizontal shafts arranged above said conveyors when counteracting spring pressure is overcome as an animal being transported by the conveyors is pushed against the electrodes.

Typical of such conveyor-type apparatus is that disclosed in application Ser. No. 905,371, which is based upon Dutch patent application No. 77.05519 laid open to public inspection.

In electrically stunning animals to be slaughtered, in particular pigs, it is of utmost importance that a proper contact is attained between the animals to be stunned and the electrodes. The jolt of current used to stun the animal should be short and intense.

In case of insufficient stunning muscular contractions may cause internal bleeding and bone breakage which distract from the value of the meat.

An irregular contact which is insufficient will cause a stress condition in the animal, whereby the pH of the meat will change which, in turn, reduces the quality and value of the meat. A short jolt of high current is necessary and should be applied as soon as a proper contact between the electrodes and the animal is achieved.

In an apparatus for electrically stunning animals to be slaughtered, a high production level, for example on the order of 300 to 600 pigs per hour, is desired.

However, the animals to be stunned are of different sizes which will result in different heights of animals being transported between the V-shaped conveyors. On the other hand, thereto the size of the heads of the animals will differ in a lesser degree. Also, some animals will try to escape from the electrodes by moving their head downwardly or to the side.

A feature of the present invention resides in improving the apparatus disclosed in my prior application in such a way that a good contact is achieved at the proper place under all circumstances.

SUMMARY OF THE INVENTION

According to the present invention, this feature is achieved by initially disposing a first electrode in a forwarddly and downwardly sloping direction toward a second electrode, which is spaced apart from the first electrode in line with the direction of movement of two parallel conveyors. Said first electrode is provided with a small electrode contact surface solely at its bottom end. The second electrode is initially disposed in a rearwardly and downwardly sloping direction toward the first electrode opposite to the direction of movement of the conveyors. Said second electrode is provided with an electrode contact surface covering substantially the entire side thereof facing said first electrode.

Upon transportation of the animals toward the electrodes positioned between the conveyors and regardless of the size of the animal to be stunned, the head of the animal will now push the first electrode or electrodes as the animal is transported by the conveyors, causing the electrodes to pivot upward so that only the end of the first electrode properly contacts the head in a current-conductive manner. When the first electrode contact surface becomes positioned in the area located at the top or at the back of the head, the animal's snout will generally always touch the electrode contact surface of the second electrode irrespective of the height of the animal and the current circuit will be closed.

Preferably, the electrodes are disposed so that the initial position of said second electrode is essentially tangential to a circle forming a concentric circle with respect to the arc of the turning circle of said first electrode, and the central position of said first electrode is substantially perpendicular to the initial position of said second electrode. Therefore, the distance between the two electrodes will remain substantially the same once the electrodes have been initially adjusted at a predetermined distance with respect to each other. Hence, the current passing through the head of the animal will travel substantially the same distance this being of importance for a proper stunning of the animal.

BRIEF DESCRIPTION OF THE DRAWINGS

The invention will now be described in further detail with reference to the appended drawings, in which.

DESCRIPTION OF THE PRESENTLY PREFERRED EMBODIMENT

Figure 2:
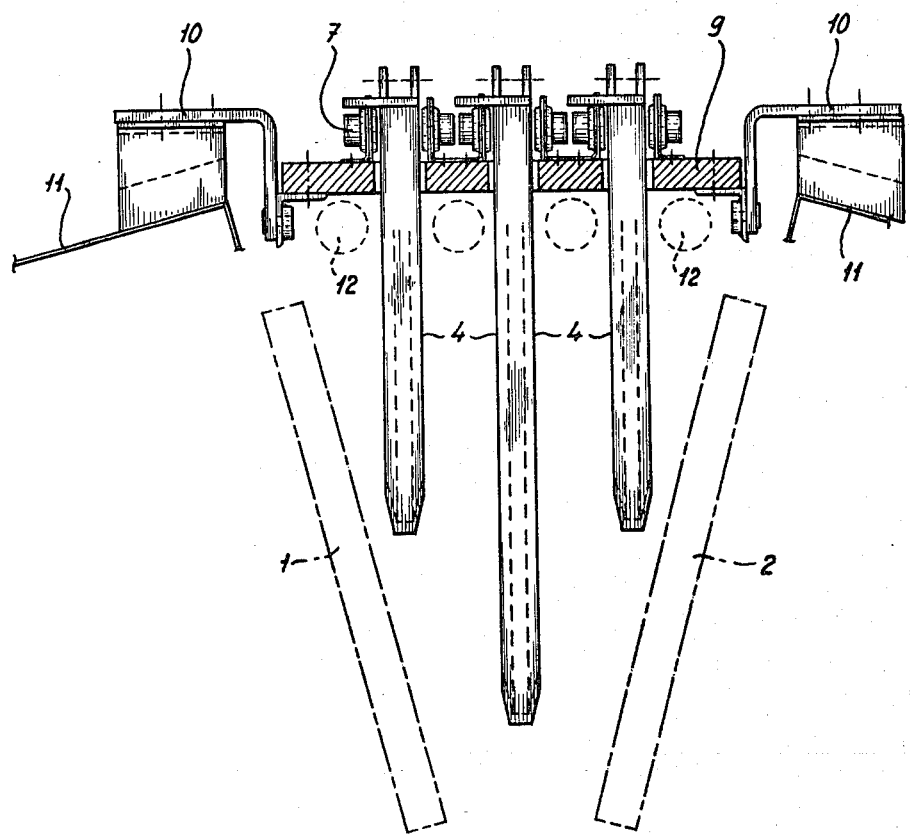
FIG. 2 shows a vertical cross section along the line II—II in FIG. 1.

In FIG. 2 shown is a diagrammatical representation the conveyors 1 and 2, which are positioned to form a V-shaped passageway therebetween.

Figure 1:
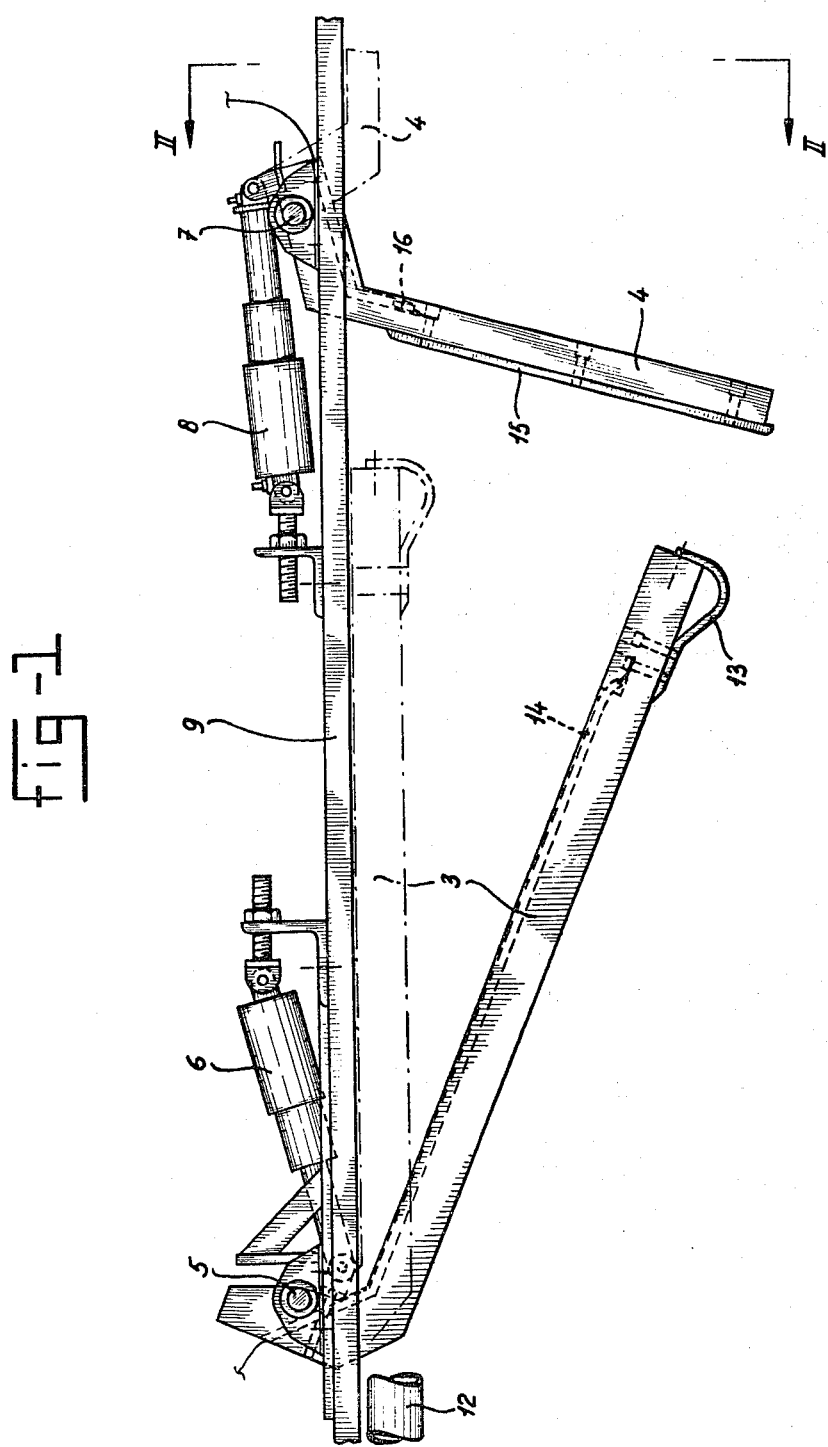
FIG. 1 shows a side elevation of the electrode arrangement according to the invention.

With reference to FIG. 1, shown are a first set of electrodes 3 and a second set of electrodes 4, each set including three separate electrodes, as shown in FIG. 2, which extend down into the passageway between the conveyors 1 and 2 in such a manner that the main part of this passageway is covered.

In the presently preferred embodiment, each of electrodes 3 are independently operable to pivot about a horizontal shaft 5 and are biased by spring 6.

In a similar manner, each of electrodes 4 are independently operable to pivot about a horizontal shaft 7 and are biased by spring 8.

The bearings of the shafts 5 and 7 and the springs 6 and 8 are affixed to a plate 9, which is in turn affixed to supports 10 mounted on frame 11 (not shown in detail) of the conveyor apparatus. Tubes 12 (which are indicated by interrupted circles) may form an upper restriction of the conveyor apparatus.

At the lower end thereof, each one of the electrode arms 3 is provided with a small bent electrode contact portion 13 which is connected to a cable 14 provided in the electrode arm.

On the side facing the first electrode, each one of the electrode arms 4 is covered by a conductive contact portion 15, which extends over substantially the entire height of said arm, and which is connected to a cable 16.

As shown in FIG. 1, the sets of electrodes may be swung or pivoted upward entirely to the horizontal position to enable a stunned animal to pass thereunder. FIG. 1 shows both sets of electrodes in their initial position. An animal arriving from the left-hand side, with respect to the orientation shown in FIG. 1, will push the electrodes and cause at least one of the arms 3 including the electrodes 13, to pivot upward without causing a substantial change in the distance between the electrode arms 4 and the electrodes 15. As soon as the animal contacts an electrode 15, the current circuit will be closed.

The distance between the sets of electrodes may be adjusted in the longitudinal direction, that is, a direction coinciding with the travel of the conveyor, by displacing one set thereof on the plate 9 and adjusting the same in another. Furthermore, it is within the contemplation of the present invention to switch in the jolt of current only after the animal has displaced the second electrode over an arc having a length equal to a predetermined angle as opposed to automatically applying the jolt of current at the moment that the animal simultaneously contacts both electrodes.

It is to be understood that the invention will admit of other embodiments. The description of the presently preferred embodiment is given only to facilitate understanding of the invention by those skilled in the art and should not be construed as limiting the invention.

What is claimed is:

1. An apparatus for electrically stunning animals to be slaughtered, comprising:

two endless conveyors, said conveyors being operable to run parallel to each other and at a synchronized rate and being positioned to form a substantially V-shaped passageway therebetween; and, a first electrode and a second electrode spaced apart from said first electrode, said electrodes being adapted to contact the head of an animal, said electrodes being adapted to extend downwardly toward said V-shaped passageway, said electrodes being adapted to be pushed in the direction of movement out of their initial position, said electrodes being biased toward their initial position by spring pressure, said electrodes being rotatable about horizontal shafts arranged above said conveyors, the first electrode being directed slopingly downward to the front in the direction of movement, said first electrode having an electrode contact surface at its lower end, the second electrode being directed slopingly downward and backward, said second electrode having an electrode contact surface over substantially the entire side thereof facing said first electrode.

2. The apparatus according to claim 1, wherein said second electrode in its initial position is essentially tangential to a circle forming a concentric circle with respect to the arc of the turning circle of said first electrode, and wherein said first electrode in its center position is substantially perpendicular to said second electrode in its initial position.

* * * * *

UNITED STATES PATENT AND TRADEMARK OFFICE
CERTIFICATE OF CORRECTION

PATENT NO. : 4,319,383
DATED : March 16, 1982
INVENTOR(S) : Johan W. Nijhuis

It is certified that error appears in the above-identified patent and that said Letters Patent are hereby corrected as shown below:

```
Column 1, line 25, "being" should be --which are--;
Column 1, line 60, delete "thereto";

Column 2, line 47, "shows" should be --is--;
Column 2, line 48, before "invention" insert --present--;
Column 2, line 49, before "along" insert --taken--;
Column 2, line 54, after "representation" insert --of--;
Column 2, line 55, delete "the".
```

Signed and Sealed this

Twenty-fourth Day of August 1982

[SEAL]

Attest:

GERALD J. MOSSINGHOFF

Attesting Officer   Commissioner of Patents and Trademarks